(12) United States Patent
Cheng et al.

(10) Patent No.: US 10,185,129 B2
(45) Date of Patent: Jan. 22, 2019

(54) OPTICAL LENS

(71) Applicant: Young Optics Inc., Hsinchu (TW)

(72) Inventors: Hung-You Cheng, Hsinchu (TW);
Kai-Yun Chen, Hsinchu (TW);
Yu-Hung Chou, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 0 days.

(21) Appl. No.: 15/465,610

(22) Filed: Mar. 22, 2017

(65) Prior Publication Data

US 2018/0275379 A1    Sep. 27, 2018

(51) Int. Cl.
| | |
|---|---|
| *G02B 13/02* | (2006.01) |
| *G02B 9/04* | (2006.01) |
| *G02B 9/64* | (2006.01) |
| *G02B 13/22* | (2006.01) |
| *G02B 13/16* | (2006.01) |
| *G02B 9/60* | (2006.01) |
| *G02B 13/18* | (2006.01) |

(52) U.S. Cl.
CPC .............. *G02B 13/22* (2013.01); *G02B 9/04* (2013.01); *G02B 9/60* (2013.01); *G02B 9/64* (2013.01); *G02B 13/16* (2013.01); *G02B 13/18* (2013.01)

(58) Field of Classification Search
CPC ............................. G02B 9/08; G02B 13/0045
USPC ......... 359/717, 708, 713–716, 754–795, 740
See application file for complete search history.

(56) References Cited

U.S. PATENT DOCUMENTS

| | | | | |
|---|---|---|---|---|
| 3,038,380 | A * | 6/1962 | Helmut | G02B 9/34 359/781 |
| 3,447,861 | A * | 6/1969 | Schlegel | G02B 9/58 359/660 |
| 6,712,474 | B2 | 3/2004 | Narimatsu | |
| 7,215,484 | B2 * | 5/2007 | Yamashita | G02B 15/177 359/682 |
| 7,656,587 | B2 | 2/2010 | Hsu et al. | |
| 8,693,109 | B2 | 4/2014 | Yanagisawa | |

(Continued)

FOREIGN PATENT DOCUMENTS

| | | |
|---|---|---|
| CN | 102540422 | 12/2014 |
| JP | 2006215476 | 8/2006 |

(Continued)

OTHER PUBLICATIONS

Office Action of Taiwan Counterpart Application, dated Oct. 16, 2018, pp. 1-4.

*Primary Examiner* — Darryl J Collins
(74) *Attorney, Agent, or Firm* — JCIPRNET

(57) ABSTRACT

A telecentric lens including a first lens group, an aperture stop, and a second lens group arranged in order from a magnified side to a minified side is provided. The first lens group has an outmost lens facing the magnified side, and the second lens group has an outmost lens facing the minified side. At least one of the outmost lens of the first lens group and the outmost lens of the second lens group is formed of glass. At least one of the first lens group and the second lens group has a lens having negative refractive power and being composed of plurality of lenses being mutually contacted to each other. The condition: TTL<100 mm is satisfied, wherein TTL denotes a length measured along an optical axis and between two outmost opposite lens surfaces of the telecentric lens.

19 Claims, 9 Drawing Sheets

(56) References Cited

U.S. PATENT DOCUMENTS

2014/0078605 A1\* 3/2014 Ohashi ............... G02B 13/0045
359/754

FOREIGN PATENT DOCUMENTS

| JP | 2016126254 | 7/2016 |
|----|------------|--------|
| TW | 201600876  | 1/2016 |

\* cited by examiner

OPTICAL LENS

BACKGROUND OF THE INVENTION

1. Field of the Invention

The invention generally relates to an optical lens and, in particular, to a telecentric lens.

2. Description of Related Art

In general, a long projection distance is required if a projector needs to project an image onto a large screen. Contrarily, a special wide-angle lens is required to shorten the distance from the screen to the projector if the image is to be projected onto the large screen from a short projection distance. That is, the wide-angle lens may effectively reduce the distance from the screen to the projector and project a relatively large image. However, the aberration issue derived from the lens is one of the obstacles faced by designers. Besides, in response to the increase of image circle, the optical lens needs to be designed to meet the requirements of different projection sizes for favorable optical quality.

SUMMARY OF THE INVENTION

An embodiment of the invention is directed an optical lens system having low costs and favorable optical characteristics.

In an embodiment of the invention, an optical lens (for example, a telecentric lens) that includes a first lens group, an aperture stop, and a second lens group in order from a magnified side to a minified side. Each of the first lens group and the second lens group has an outmost lens, having refractive power, from the aperture stop having an aspheric surface. The outmost lens of the first lens group and the second lens group is facing the magnified side and minified side respectively, and the outmost lens in the second lens group is formed of glass. Furthermore, the second lens group may comprises a triplet cement lens composed of three lenses having an overall power of negative. Moreover, the total length of the optical lens between two outmost opposite lens surfaces of the optical lens, along an optical axis and, is less than 100 mm.

In view of the above, the design of the optical lens provided in an embodiment of the invention provides a solution of low temperature influence and distortion.

Other features and advantages of the invention will be further understood from the further technological features disclosed by the embodiments of the invention wherein there are shown and described embodiments of this invention, simply by way of illustration of modes suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the embodiments, reference is made to the accompanying drawings which form a part hereof, and in which are shown by way of illustration specific embodiments in which the invention may be practiced. The drawings and descriptions will be regarded as illustrative in nature and not as restrictive.

Figure 1A:
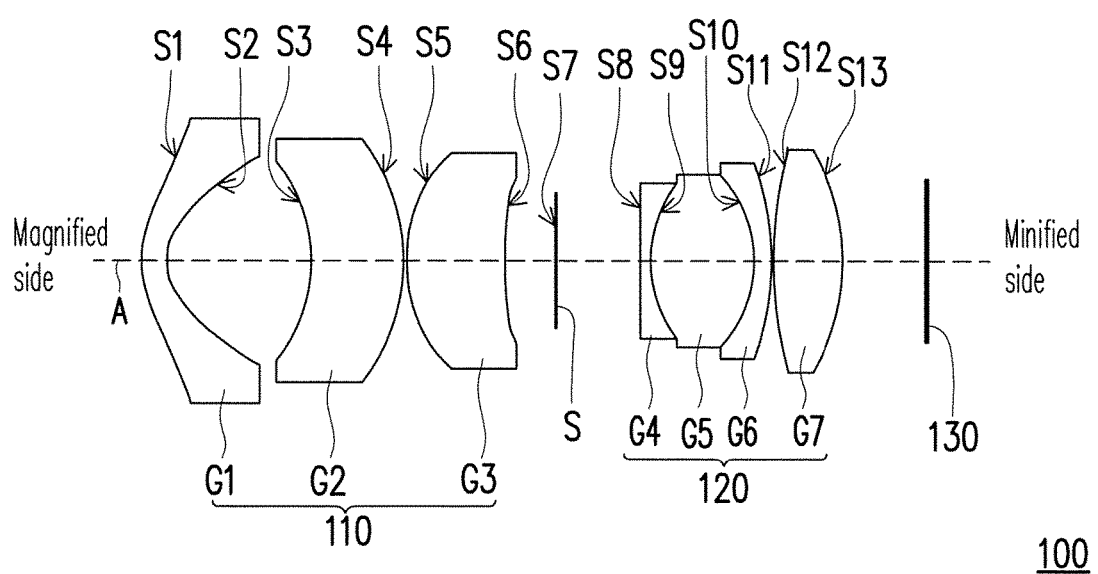
FIG. 1A is a schematic view briefly illustrating an optical lens according to an embodiment of the invention.

FIG. 1A is a schematic view briefly illustrating an optical lens according to an embodiment of the invention. With reference to FIG. 1A, the optical lens 100 provided in the present embodiment, may be a telecentric lens system, and has an optical axis A, and the optical lens 100 is located between a magnified side and a minified side. The optical lens 100 includes a first lens group 110, an aperture stop S, and a second lens group 120. It should be noticed that, unless otherwise stated, the lens group may comprises, but not limited to, only one lens therein. The first lens group 110 is disposed between the magnified side and the aperture stop S and the first lens group 110 has a positive refractive power. The second lens group 120 is located between the aperture stop S and the minified side and the second lens group 120 has a positive refractive power. The optical lens 100 is capable of forming an image at the magnified side.

In the present embodiment, the first lens group 110 includes a first lens G1, a second lens G2 and a third lens G3 arranged in sequence from the magnified side towards the minified side. The second lens group 120 includes a fourth lens G4, fifth lens G5, sixth lens G6 and a seventh lens G7 arranged in sequence from the magnified side towards the minified side. Moreover, for example, the first lens has a surface that the curvature radius thereof is not infinity, or say, at least one surface thereof is not flat. Therefore, for example, a glass cover having two flat surfaces may not be considered as a lens.

The first lens G1 and the seventh lens G7 is an outmost lens in the first lens group 110 and the second lens group 120 respectively. In particular, the first lens G1 is the farthest lens having refractive power in the first lens group 110 from the aperture stop S along the optical axis A toward the magnified side, or the closest lens having refractive power in the first lens group 110 to the magnified side. The outmost surface of the first lens G1 is facing the magnified side. In particular, the seventh lens G7 is the farthest lens having refractive power in the second lens group 120 from the aperture stop S along the optical axis A, or the closest lens having refractive power in the second lens group 120 to the minified side. The outmost surface of the seventh lens G7 is facing the minified side.

In the present embodiment, the second lens group comprises four lenses, and at least three of the four lenses are fixed together mutually. More specifically, the fourth lens G4, fifth lens G5 and a sixth lens G6 arranged in sequence from the magnified side towards the minified side, the fourth lens G4, fifth lens G5 and sixth lens G6 are mutually contacted and fixed together so as to form a triplet cemented lens. The lens may be fixed by glue or by mechanical means instead and not limited thereto.

In the present embodiment, the refractive powers of the first lens to the seventh lens are negative, negative, positive, negative, positive, negative and positive respectively. The second lens G2, the fourth lens G4, fifth lens G5, sixth lens G6 and seventh lens G7 are all formed of glass, and the first lens G1 and third lens G3 is formed of plastic respectively. In another way, the temperature coefficients of refractive index of the second lens G2, the fourth lens G4, the fifth lens G5, the sixth lens G6 and seventh lens G7 may optionally be positive for a better performance for aberration caused by temperature raise. And the temperature coefficients of refractive index of the first lens G1 and the third lens G3 may optionally be negative.

Additionally, according to the present embodiment, an imaging process device 130, having a virtual imaging plate formed thereon, can be arranged at the minified side for inputting or outputting image light. The imaging process device 130 described in the embodiment may refer to at least a light valve, and the light valve may be a digital micromirror device (DMD), or liquid crystal display (LCD) for instance. In some related embodiments, the optical lens 100 further includes an optical element, such as total internal reflection prism (TIR prism) or field lens located between the seventh lens G7 and the imaging process device 130. Moreover, the said field lens may refer to a lens that disposed adjacent to the DMD, and thereof both illuminating light and image light may pass therethrough.

In the present embodiment, the optical lens 100 is a projection lens for a micro-projector, or called, PICO projector and for example, a projection lens having a fixed focal length. In detail, the image light is inputted from the seventh lens G7 and outputted from the first lens G1, then the image light is projected toward the magnified side. The diagonal length of the light valve is, for example, 3 inches, and the resolution of thereof is, for example, 1280*720, the invention is not limited thereto. Besides, the positions of the first lens group 110 and the second lens group 120 of the optical lens 100 are relatively fixed, and both first lens group 110 and the second lens group 120 can be moved together for focusing the optical lens 100.

Specific data of each lens in the optical lens 100 depicted in FIG. 1A are provided below.

TABLE 1

| Surface | Curvature Radius (mm) | Interval (mm) | Refractive index | Abbe Number | Remarks |
|---|---|---|---|---|---|
| S1* | 5.52 | 1.50 | 1.53 | 56.3 | First lens |
| S2* | 2.93 | 8.64 | | | |
| S3* | −8.72 | 5.58 | 1.81 | 40.7 | Second lens |
| S4* | −10.38 | 0.10 | | | |
| S5* | 9.54 | 5.88 | 1.53 | 56.3 | Third lens |
| S6* | 26.39 | 3.08 | | | |
| S7 | Infinity | 4.98 | | | Stop |
| S8 | Infinity | 0.65 | 1.65 | 39.7 | Fourth lens |
| S9 | 8.00 | 6.29 | 1.55 | 75.5 | Fifth lens |
| S10 | −7.16 | 0.90 | 1.83 | 37.2 | Sixth lens |
| S11 | −17.27 | 0.10 | | | |
| S12* | 20.86 | 4.16 | 1.58 | 59.2 | Seventh lens |
| S13* | −13.01 | 15.28 | | | |
| Image plane | Infinity | | | | Imaging process device |

In Table 1, a symbol of * is utilized to indicate the aspheric surface. The interval represents a linear distance between two adjacent surfaces on the optical axis A. For instance, the interval of the surface S1 represents the linear distance between the surface S1 and the surface S2 on the optical axis A. The thickness, the refractive index, and the Abbe number corresponding to each lens are recited in Table 1, and the corresponding lenses surface are recited in the Notes column. Besides, in Table 1, the surfaces S1 and S2 are two surfaces of the first lens G1, while S1 is facing the magnified side. The surfaces S7 refer to the aperture stop S, the surface S9 is a cemented surface and connected to the fourth lens G4 and the fifth lens G5, the surface S9 and S10 are both cemented surface connecting the fourth lens G4, fifth lens G5 and sixth lens G6.

In the present embodiment, the surfaces S1, S2, S3, S4, S5, S6, S12, and S13 are aspheric surfaces and may be expressed by the following formula (1):

$$Z = \frac{cr^2}{1 + \sqrt{1 - (1+k)c^2 r^2}} + A_2 r^2 + A_4 r^4 + A_6 r^6 + A_8 r^8 + A_{10} r^{10} + A_{12} r^{12} + A_{14} r^{14} + A_{16} r^{16} + \ldots \quad (1)$$

In the formula (1), Z is a sag in the direction of the optical axis A, and c is the reciprocal of the radius of an osculating sphere, i.e., the reciprocal of the curvature radius (e.g., the curvature radii of the surfaces S1 to S6 and the surfaces S12 to S13 in Table 1) close to the optical axis A; k is a conic coefficient, r is the height of the aspheric surface, i.e., the height from the center of the lens to the edge of the lens, $A_2$, $A_4$, $A_6$, $A_8$, $A_{10}$, $A_{12}$, $A_{14}$, $A_{16}$ . . . are aspheric coefficients, and the coefficient $A_2$ is zero according to the present embodiment of the invention. The parameters of the surfaces S1 to S6 and the surfaces S12 to S13 in the optical lens 100 are listed in Table 2.

TABLE 2

| | Aspheric Coefficient | | | |
|---|---|---|---|---|
| | Conic Coefficient k | Coefficient $A_4$ | Coefficient $A_6$ | Coefficient $A_8$ |
| S1 | −1.01E+00 | −2.01E−03 | 4.89E−05 | −8.72E−07 |
| S2 | −1.87E+00 | 1.90E−03 | −8.52E−05 | 4.43E−06 |
| S3 | 9.73E−02 | 3.65E−04 | 5.72E−07 | −1.04E−07 |
| S4 | −7.67E−01 | 9.42E−05 | −6.86E−07 | −4.49E−08 |
| S5 | 3.58E−01 | −4.31E−06 | 1.30E−07 | 2.29E−09 |
| S6 | 0 | −2.89E−05 | 1.05E−05 | 4.16E−09 |
| S12 | 0 | −1.58E−06 | 2.39E−06 | −8.64E−08 |
| S13 | −7.58E+00 | −4.13E−04 | 7.99E−06 | −1.72E−07 |

| | Aspheric Coefficient | | |
|---|---|---|---|
| | Coefficient $A_{10}$ | Coefficient $A_{12}$ | Coefficient $A_{14}$ |
| S1 | 9.84E−09 | −6.15E−11 | 1.60E−13 |
| S2 | −1.35E−07 | 2.13E−09 | −1.34E−11 |
| S3 | 3.11E−10 | 2.32E−11 | 0 |
| S4 | 7.95E−10 | −4.31E−12 | 0 |
| S5 | −2.32E−10 | 1.36E−11 | 0 |
| S6 | −4.00E−09 | 2.17E−10 | 0 |
| S12 | 1.46E−09 | −7.79E−12 | 0 |
| S13 | 2.13E−09 | −9.92E−12 | 0 |

In the optical lens 100 provided in the present embodiment, the focal length of the first lens group 110 is 24 mm, the focal length of the second lens group is 13 mm, the effective focal length (EFL) of the optical lens 100 is 7.813 mm, the F-number (Fno) is 1.7, the total track length (TTL) is 41.86 mm between the surface S1 to S13. The throw ratio (TR) of the optical lens 100 may between 0.5 to 2, and the throw ratio of the present embodiment is about 1.1. Moreover, for example. In the present embodiment, since the seventh lens G7 closed to the light valve is formed of glass, the influence of heat on optical quality of the optical lens 100 can be reduced.

In addition, in the present embodiment, the first lens G1, the second lens G2, the third lens G3 and the seventh lens G7 comprises at least an aspheric surface respectively. The fourth lens G4, fifth lens G5 and sixth lens G6 forms a triple cemented lens, so that the distortion of the projected image can be reduced, the chromatic aberration can be reduced, and the resolution can be improved.

Moreover, in the present embodiment, the optical lens 100 satisfies one of the following conditions (1)-(2).

$$TTL < 100 \text{ mm} \tag{1}$$

$$2.5 < TTL/EFL < 6.5 \tag{2}$$

Here, TTL denotes a length measured along the optical axis A and between the first and last surface of the optical lens, more specifically, the length is measured along two outmost opposite lens surfaces of the optical lens 100. In the present embodiment, TTL denotes a length measured along the optical axis A and between the surface S1 of the first lens G1 and the surface S13 of the seventh lens G7. Besides, EFL denotes an effective focal length of the optical lens 100.

Figure 1B:
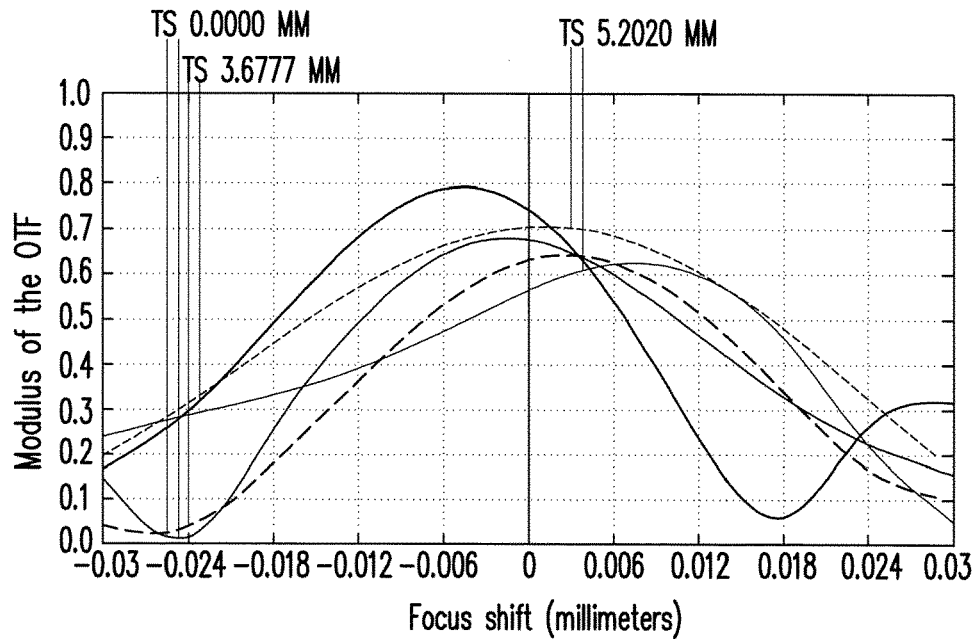
FIG. 1B, FIG. 1C, FIG. 1D and FIG. 1E illustrate optical simulation data of imaging of the optical lens in FIG. 1A.
Figure 1C:
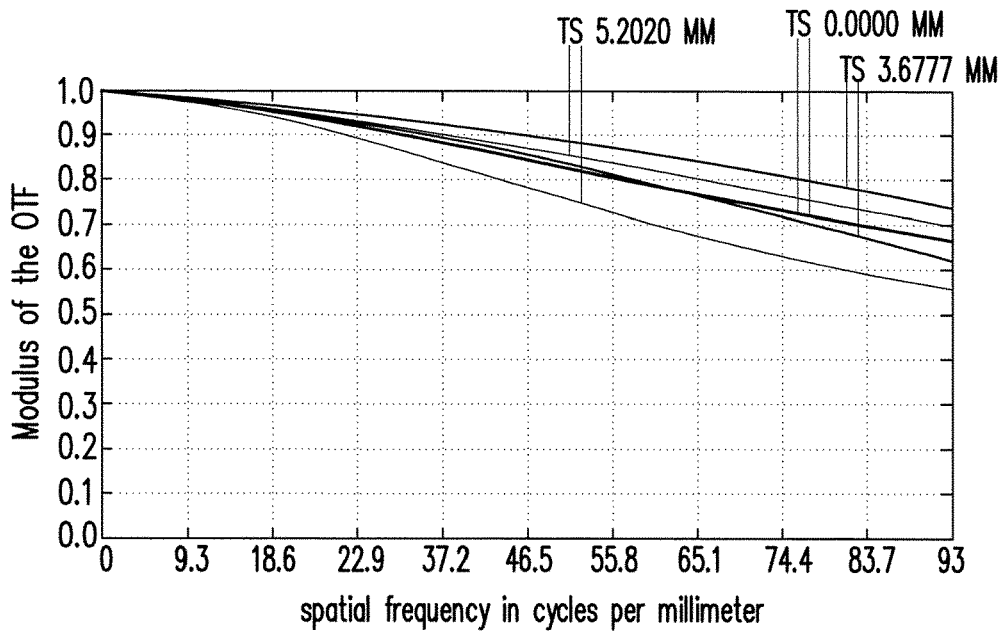
Figure 1D:
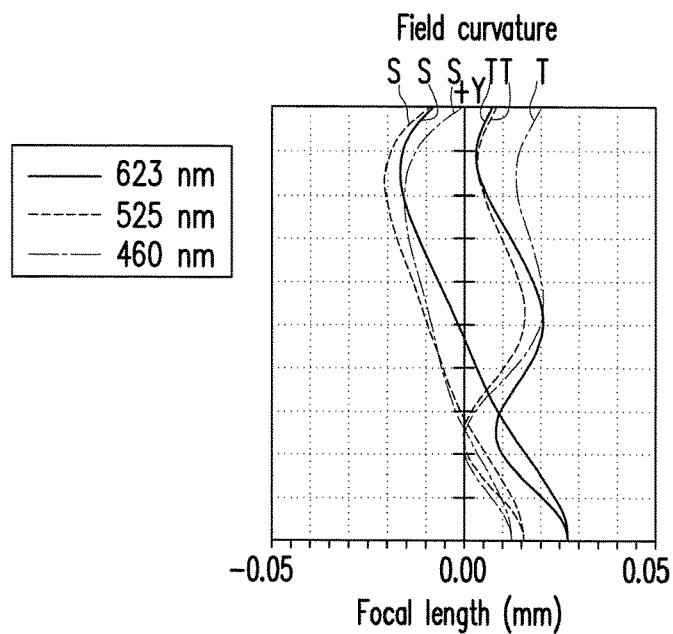
Figure 1E:
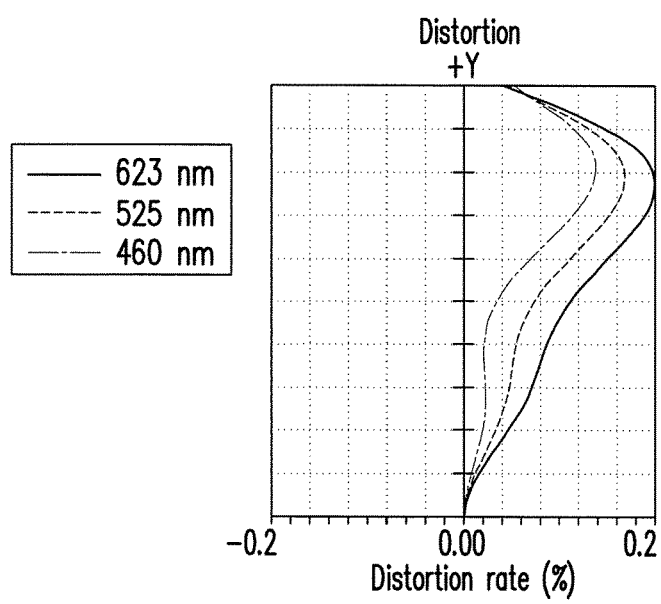

FIG. 1B, FIG. 1C, FIG. 1D and FIG. 1E illustrate optical simulation data of imaging of the optical lens in FIG. 1A. In FIG. 1B, the diffraction modulation transfer function of the optical lens 100 is shown. In FIG. 1C, the modulation transfer function of the optical lens 100 is shown, the transverse axis represents spatial frequency in cycles per millimeter, and the longitudinal axis represents the modulus of the optical transfer function (OTF). FIG. 1D and FIG. 1E respectively illustrate graphics of field curvature and distortion simulated with a light having wavelength of 623 nm, a light having wavelength of 525 nm, and a light having wavelength of 460 nm. In the present embodiment, the distortion rate is, for example, less than 0.5%. In detail, the distortion rate in this embodiment is less than 0.2%.

Reference numbers and some descriptions provided in the previous embodiments are also applied in the following embodiments. The same reference numbers represent the same or similar components in this and the previous embodiments, and repetitive descriptions are omitted. The omitted descriptions may be found in the previous exemplary embodiments.

Figure 2A:
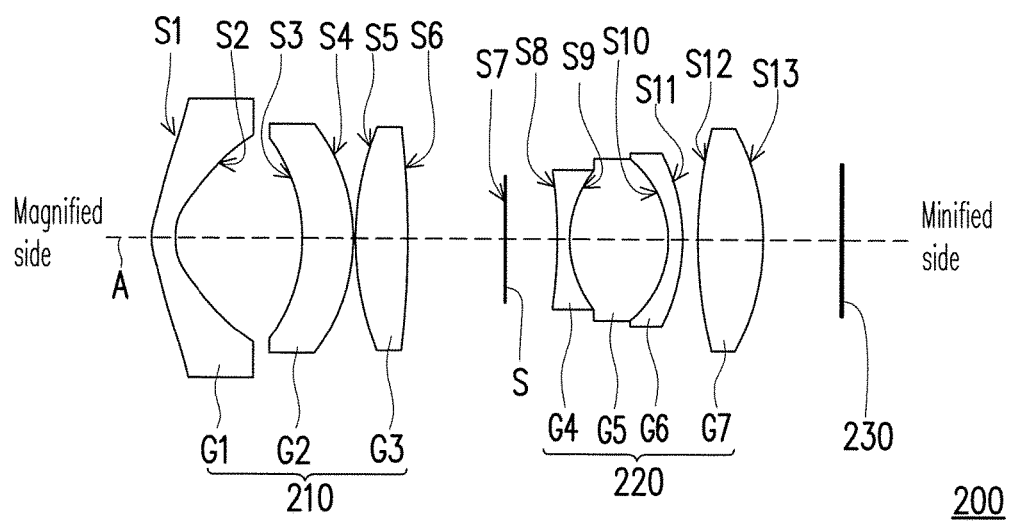
FIG. 2A is a schematic view briefly illustrating an optical lens according to another embodiment of the invention.

FIG. 2A is a schematic view briefly illustrating an optical lens according to another embodiment of the invention. With reference to FIG. 1A and FIG. 2A, the optical lens 200 provided in the present embodiment is similar to the optical lens 100 provided in the embodiment shown in FIG. 1A, and the differences there between are as follows. The optical lens 200 includes a first lens group 210, an aperture stop S, and a second lens group 220. An imaging process device 230 can be arranged at the minified side. Besides, the third lens G3 in the embodiment shown in FIG. 2A is a biconvex lens, and the fourth lens G4 in the embodiment shown in FIG. 2A is a biconcave lens.

Besides, in the embodiment shown in FIG. 2A, refractive powers of the first lens G1 to the seventh lens G7 are negative, negative, positive, negative, positive, negative and positive, respectively. In this embodiment, the first lens G1, the third lens G3, the fourth lens G4, the fifth lens G5, the sixth lens G6 and the seventh lens G7 are all formed of glass, and the second lens G2 is formed of plastic.

Specific data of each lens in the optical lens 200 depicted in FIG. 2A are provided below.

TABLE 3

| Surface | Curvature Radius (mm) | Interval (mm) | Refractive index | Abbe Number | Remarks |
|---|---|---|---|---|---|
| S1* | 6.23 | 1.50 | 1.69 | 52.9 | First lens |
| S2* | 3.24 | 8.05 | | | |
| S3* | −10.27 | 3.21 | 1.53 | 56.3 | Second lens |
| S4* | −11.89 | 0.10 | | | |
| S5 | 18.00 | 3.33 | 1.80 | 35.0 | Third lens |
| S6 | −60.23 | 6.34 | | | |
| S7 | Infinity | 3.26 | | | Stop |
| S8 | −23.86 | 0.65 | 1.65 | 39.7 | Fourth lens |
| S9 | 7.31 | 6.31 | 1.55 | 75.5 | Fifth lens |
| S10 | −6.73 | 0.90 | 1.83 | 37.2 | Sixth lens |
| S11 | −12.46 | 0.98 | | | |
| S12* | 24.33 | 4.30 | 1.58 | 59.2 | Seventh lens |
| S13* | −12.60 | 18.2 | | | |
| Image plane | Infinity | | | | Imaging process device |

The way to interpret the data and the optical parameters in Table 3 is similar to that in Table 1 and thus will not be repeated hereinafter. In the present embodiment, the surfaces S1, S2, S3, S4, S12, and S13 are aspheric surfaces and may be expressed by the above-mentioned formula (1). The parameters of the surfaces S1 to S4 and the surfaces S12 to S13 in the optical lens 200 are listed in Table 4.

TABLE 4

| | Aspheric Coefficient | | | |
|---|---|---|---|---|
| | Conic Coefficient k | Coefficient $A_4$ | Coefficient $A_6$ | Coefficient $A_8$ |
| S1 | −1.22E+00 | −2.04E−03 | 5.20E−05 | −8.92E−07 |
| S2 | −2.17E+00 | 1.14E−03 | −7.83E−05 | 4.28E−06 |
| S3 | 9.31E−01 | 1.75E−04 | 2.75E−06 | −9.46E−08 |
| S4 | −1.78E+00 | −7.69E−05 | 4.53E−07 | −4.94E−08 |
| S12 | 0 | −1.14E−04 | 1.01E−06 | −4.98E−08 |
| S13 | −7.83E+00 | −4.43E−04 | 8.10E−06 | −1.72E−07 |

| | Aspheric Coefficient | | |
|---|---|---|---|
| | Coefficient $A_{10}$ | Coefficient $A_{12}$ | Coefficient $A_{14}$ |
| S1 | 9.80E−09 | −6.01E−11 | 1.52E−13 |
| S2 | −1.33E−07 | 2.19E−09 | −1.47E−11 |
| S3 | 2.47E−09 | 7.51E−12 | 0 |
| S4 | 1.23E−09 | −8.56E−12 | 0 |
| S12 | 9.82E−10 | −8.21E−12 | 0 |
| S13 | 2.24E−09 | −1.41E−11 | 0 |

Figure 2B:
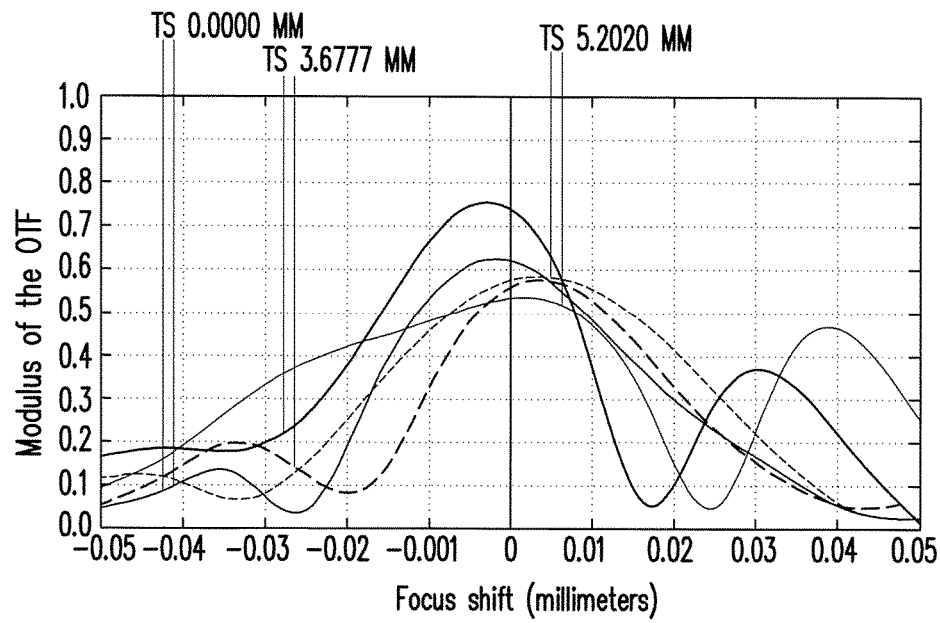
FIG. 2B, FIG. 2C, FIG. 2D and FIG. 2E illustrate optical simulation data of imaging of the optical lens in FIG. 2A.
Figure 2C:
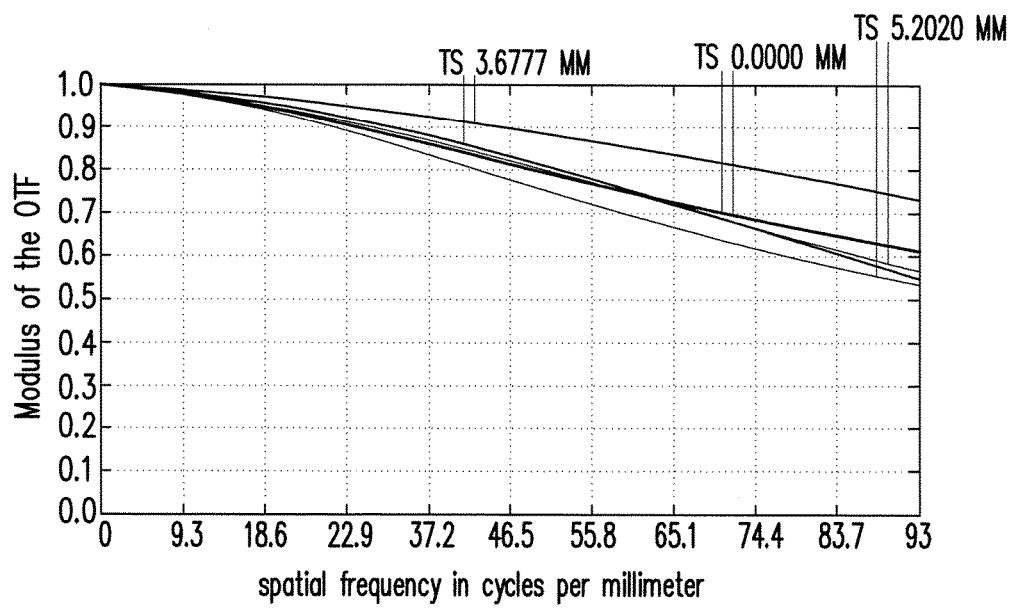
Figure 2D:
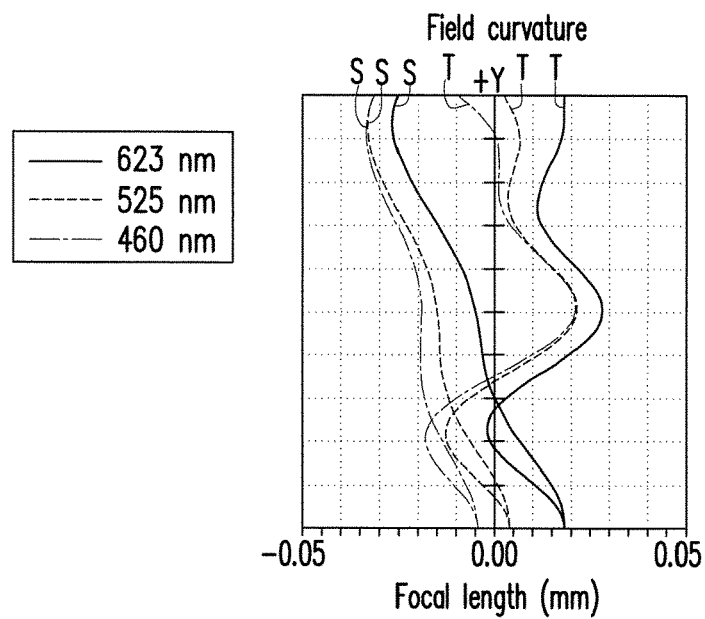
Figure 2E:
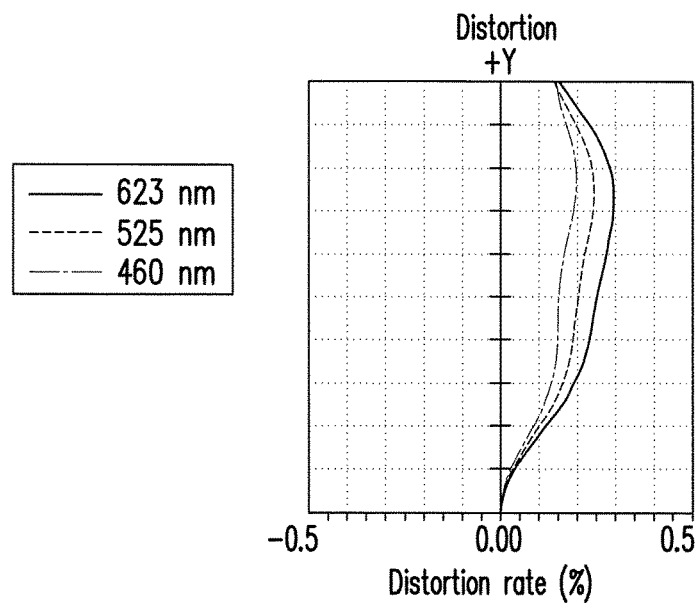

FIG. 2B, FIG. 2C, FIG. 2D and FIG. 2E illustrate optical simulation data of imaging of the optical lens in FIG. 2A. In FIG. 2B, the diffraction modulation transfer function of the optical lens 200 is shown. In FIG. 2C, the modulation transfer function of the optical lens 200 is shown. FIG. 2D and FIG. 2E respectively illustrate graphics of field curvature and distortion simulated with a light having wavelength of 623 run, 525 nm and 460 nm respectively. In this embodiment, the distortion rate is, for example, less than 0.5%.

Figure 3A:
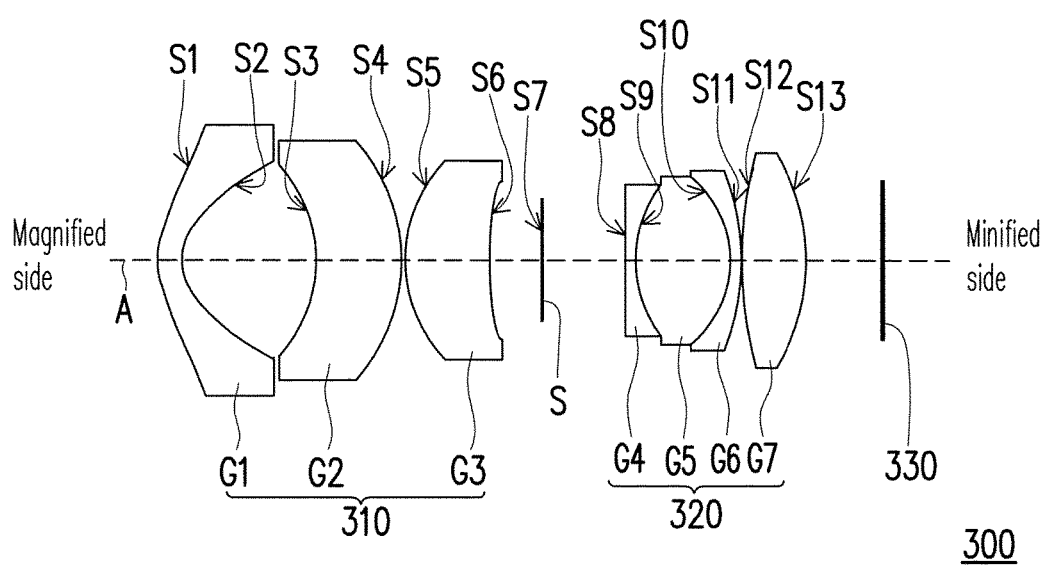
FIG. 3A is a schematic view briefly illustrating an optical lens according to another embodiment of the invention.

FIG. 3A is a schematic view briefly illustrating an optical lens according to another embodiment of the invention. With reference to FIG. 1A and FIG. 3A, the optical lens 300 provided in the present embodiment is similar to the optical lens 100 provided in the embodiment shown in FIG. 1A, and the differences there between are as follows. The optical lens 300 includes a first lens group 310, an aperture stop S, and a second lens group 320. An imaging process device 330 can be arranged at the minified side. The fourth lens G4 is a convex-concave lens having a concave surface facing the minified side. Besides, in the embodiment shown in FIG. 3A, the second lens, the third lens G3, the fourth lens G4, the fifth lens G5, the sixth lens G6 and the seventh lens G7 are formed of glass, and the first lens G1 is a plastic lens. Besides, in the embodiment shown in FIG. 3A, refractive powers of the first lens G1 to the seventh lens G7 are negative, positive, positive, negative, positive, negative and positive, respectively.

Specific data of each lens in the optical lens 300 depicted in FIG. 3A are provided below. Note that the invention is not limited to the data listed in Tables 1-6. It should be known to those having ordinary skill in the pertinent art that various modifications and variations can be made to the parameters or settings provided herein without departing from the scope or spirit of the invention.

TABLE 5

| Surface | Curvature Radius (mm) | Interval (mm) | Refractive index | Abbe Number | Remarks |
|---|---|---|---|---|---|
| S1* | 5.52 | 1.50 | 1.53 | 56.0 | First lens |
| S2* | 2.93 | 8.64 | | | |
| S3* | −8.72 | 5.58 | 1.80 | 40.7 | Second lens |
| S4* | −10.38 | 0.10 | | | |
| S5* | 9.88 | 5.48 | 1.58 | 59.2 | Third lens |
| S6* | 22.43 | 3.47 | | | |
| S7 | Infinity | 5.33 | | | Stop |
| S8 | 328.31 | 0.65 | 1.65 | 39.7 | Fourth lens |
| S9 | 8.35 | 6.12 | 1.55 | 75.5 | Fifth lens |
| S10 | −7.23 | 0.65 | 1.83 | 37.2 | Sixth lens |
| S11 | −17.43 | 0.10 | | | |
| S12* | 20.86 | 4.16 | 1.58 | 59.2 | Seventh lens |
| S13* | −13.01 | 15.28 | | | |
| Image plane | | | | | Imaging process device |

The way to interpret the data and the optical parameters in Table 5 is similar to that in Table 1 and thus will not be repeated hereinafter. In the present embodiment, the aspheric surfaces may be expressed by the above-mentioned formula (1). The parameters of the surfaces S1 to S6 and the surfaces S12 to S13 in the optical lens 300 are listed in Table 6.

TABLE 6

| | Aspheric Coefficient | | | |
|---|---|---|---|---|
| | Conic Coefficient k | Coefficient $A_4$ | Coefficient $A_6$ | Coefficient $A_8$ |
| S1 | −1.01E+00 | −2.01E−03 | 4.89E−05 | −8.72E−07 |
| S2 | −1.87E+00 | 1.90E−03 | −8.52E−05 | 4.43E−06 |
| S3 | 9.73E−02 | 3.65E−04 | 5.72E−07 | −1.04E−07 |
| S4 | −7.67E−01 | 9.42E−05 | −6.86E−07 | −4.49E−08 |
| S5 | 5.60E−01 | −2.95E−05 | 6.04E−07 | −4.00E−08 |
| S6 | 0 | −1.72E−06 | 6.51E−06 | 2.46E−07 |
| S12 | 0 | −1.58E−04 | 2.39E−06 | −8.64E−08 |
| S13 | −7.58E+00 | −4.13E−04 | 7.99E−06 | −1.72E−07 |

| | Aspheric Coefficient | | |
|---|---|---|---|
| | Coefficient $A_{10}$ | Coefficient $A_{12}$ | Coefficient $A_{14}$ |
| S1 | 9.84E−09 | −6.15E−11 | 1.60E−13 |
| S2 | −1.35E−07 | 2.13E−09 | −1.34E−11 |
| S3 | 3.11E−10 | 2.32E−11 | 0 |
| S4 | 7.95E−10 | −4.31E−12 | 0 |
| S5 | 9.27E−10 | −2.72E−12 | 0 |
| S6 | −1.18E−08 | 3.00E−10 | 0 |
| S12 | 1.46E−09 | −7.79E−12 | 0 |
| S13 | 2.13E−09 | −9.92E−12 | 0 |

Figure 3B:
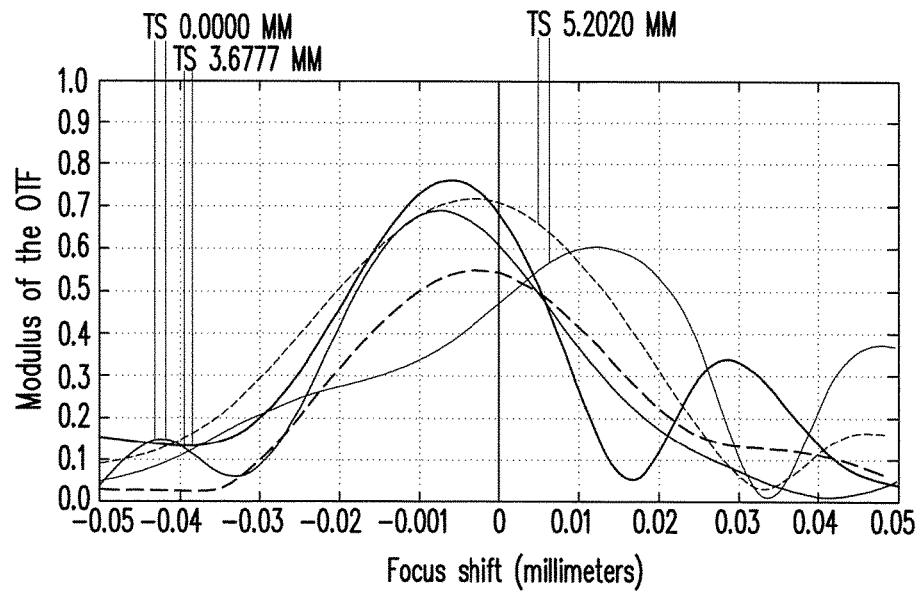
FIG. 3B, FIG. 3C, FIG. 3D and FIG. 3E illustrate optical simulation data of imaging of the optical lens in FIG. 3A.
Figure 3C:
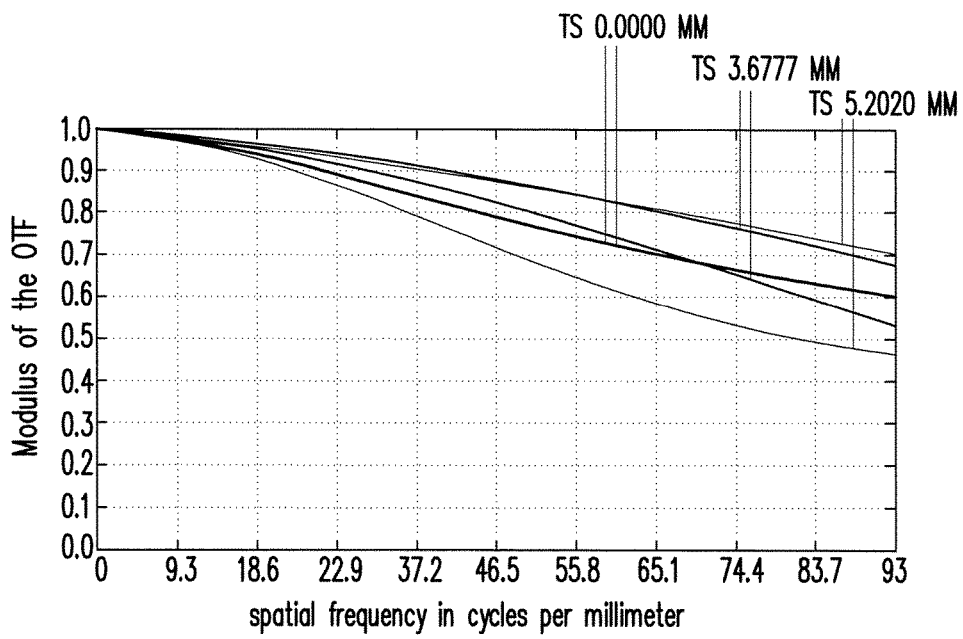
Figure 3D:
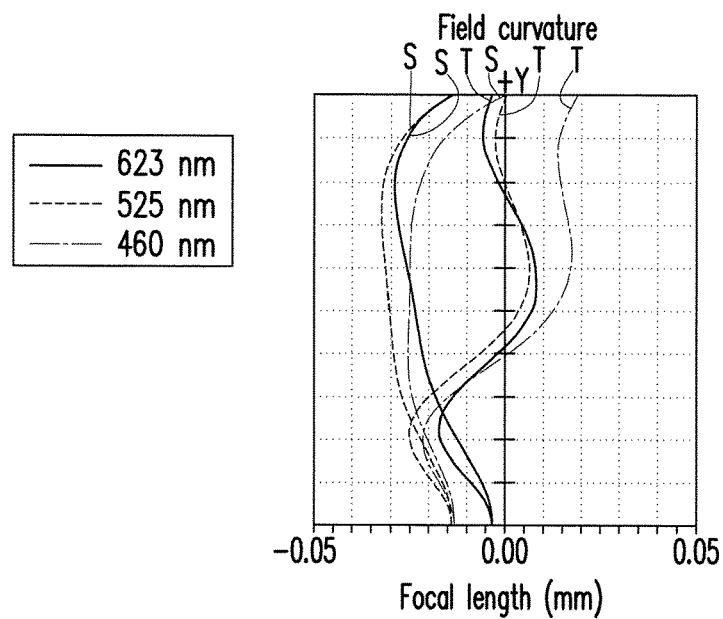
Figure 3E:
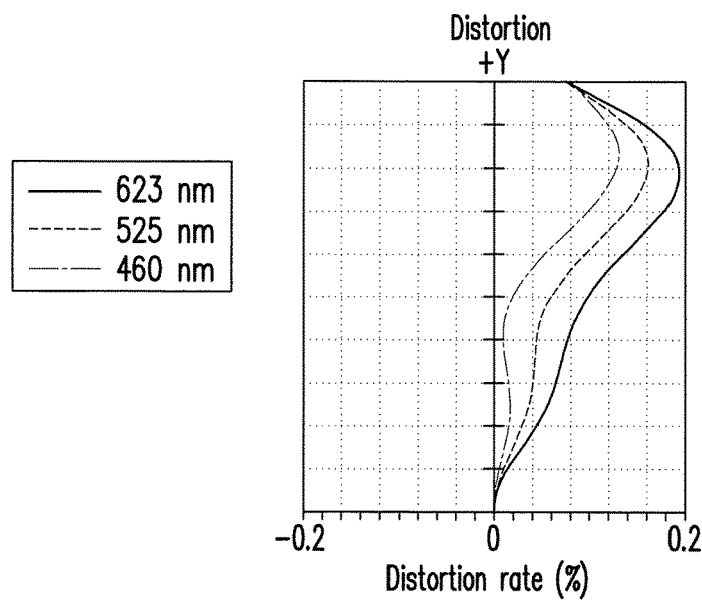

FIG. 3B, FIG. 3C, FIG. 3D and FIG. 3E illustrate optical simulation data of imaging of the optical lens in FIG. 3A. In FIG. 3B, the diffraction modulation transfer function of the optical lens 300 is shown. In FIG. 3C, the modulation transfer function of the optical lens 300 is shown, the transverse axis represents spatial frequency in cycles per millimeter, and the longitudinal axis represents the modulus of the optical transfer function. FIG. 3D and FIG. 3E respectively illustrate graphics of field curvature and distortion simulated with a light having wavelength of 623 nm, 525 nm, and 460 nm. In this embodiment, the distortion rate is, for example, less than 0.5%. In detail, the distortion rate in this embodiment is less than 0.2%. The graphics provided in the embodiments as respectively shown in FIG. 1B to FIG. 1E, FIG. 2B to FIG. 2E, and FIG. 3B to FIG. 3E are within the standard range, and thus the optical lenses 100, 200, and 300 provided in the embodiments of the invention can all satisfy the requirements for low costs, miniaturization, slimness, high resolution capability, little distortion, large aperture, good optical quality and favorable throw ratio, to meet the optical requirements of different projection sizes.

To sum up, the design of the optical lens provided herein satisfies the predetermined requirements for low costs, miniaturization, slimness, high resolution capability, little distortion, large aperture, favorable optical quality and favorable throw ratio, to meet the optical requirements of different projection sizes.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like does not necessarily limit the claim scope to a specific embodiment, and the reference to particular exemplary embodiments of the invention does not imply a limitation on the invention, and no such limitation is to be inferred. The invention is limited only by the spirit and scope of the appended claims. Any advantages and benefits described may not apply to all embodiments of the invention. It should be appreciated that variations may be made in the embodiments described by persons skilled in the art without departing from the scope of the invention as defined by the following claims. Moreover, no and component in the present disclosure is intended to be dedicated to the public regardless of whether the or component is explicitly recited in the following claims.

What is claimed is:

1. An optical lens comprising, in order from a magnified side to a minified side:
    a first lens group, the first lens group comprises a first lens, a second lens and a third lens arranged in sequence from the magnified side towards the minified side;
    an aperture stop; and a second lens group, the second lens group comprises a fourth lens, a fifth lens, a sixth lens and a seventh lens arranged in sequence from the magnified side towards the minified side, the fourth lens, the fifth lens and the sixth lens are being mutually contacted to each other to form a lens that having an overall refractive power of negative;

wherein, the farthest lens having refractive power from the aperture stop in the first lens group having an aspheric surface, the farthest lens having refractive power from the aperture stop in the second lens group having an aspheric surface and formed of glass, the condition: TTL<100 mm is satisfied, wherein TTL denotes a length measured along an optical axis and between two farthest opposite lens surfaces of the optical lens.

2. The optical lens according to claim 1, wherein fourth lens, the fifth lens and the sixth lens are being mutually contacted to each other so as to form a triplet cement lens; at least three lens of the optical lens are formed of glass.

3. The optical lens according to claim 2, wherein, at least two of the fourth lens, fifth lens and the sixth lens having negative refractive powers.

4. The optical lens according to claim 1, wherein the condition of: 2.5<TTL/EFL<6.5 is satisfied.

5. The optical lens according to claim 1, wherein refractive powers of the first lens, the second lens, the third lens, the fourth lens, the fifth lens, the sixth lens and the seventh lens are negative, positive, positive, negative, positive, negative and positive respectively.

6. The optical lens according to claim 1, wherein refractive powers of the first lens, the second lens, the third lens, the fourth lens, the fifth lens, the sixth lens and the seventh lens are negative, negative, positive, negative, positive, negative and positive respectively.

7. The optical lens according to claim 1, wherein each of the first lens, the second lens, the third lens and the seventh lens has an aspheric surface.

8. The optical lens according to claim 1, wherein a refractive index of the first lens is in a range of 1.48 to 1.69.

9. The optical lens according to claim 1, wherein refractive powers of the first lens group and the second lens group are both positive.

10. An optical lens, arranging in sequence in order from a magnified side to a minified side, comprising:
two lenses, having refractive power;
an aperture stop; and
four lenses, having refractive power, wherein at least three of the four lenses are fixed together mutually and having an overall refractive power of negative, the condition:
2.5<TTL/EFL<6.5 is satisfied, wherein TTL denotes a length measured along an optical axis and between two outmost opposite lens surfaces of the optical lens, and EFL denotes an effective focal length of the optical lens.

11. The optical lens according to claim 10, the closest lens having refractive power to the magnified side having an aspheric surface, the closest lens having refractive power to the minified side having an aspheric surface and formed of glass.

12. The optical lens according to claim 11, comprising three lens having refractive power between the aperture stop and magnified side, the refractive power of the three lens are negative, positive, positive.

13. The optical lens according to claim 11, comprising three lens having refractive power between the aperture stop and magnified side, the refractive power of the three lens are negative, negative, positive.

14. The optical lens according to claim 11, comprising three lens having refractive power between the aperture stop and magnified side, all three lens has an aspheric surface.

15. The optical lens according to claim 10, wherein, the condition of: TTL<100 mm is satisfied.

16. The optical lens according to claim 15, the closest lens having refractive power to the magnified side having a refractive index in a range of 1.48 to 1.69, the optical lens comprises at least three lens formed of glass.

17. The optical lens according to claim 10, wherein the three lenses fixed together is a triple cemented lens.

18. The optical lens according to claim 17, wherein the triple cemented lens comprises at least two lens having refractive powers of negative.

19. The optical lens according to claim 10, wherein an overall refractive power of the lenses between the aperture stop and magnified side is positive, an overall refractive power of the lenses between the aperture stop and minified side is positive.

* * * * *